(12) United States Patent
Sonoda et al.

(10) Patent No.: US 10,826,425 B2
(45) Date of Patent: Nov. 3, 2020

(54) DRIVE DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Yoshihiro Sonoda, Toyota (JP); Ryota Arakawa, Nagoya (JP); Masashi Yoshimi, Toyota (JP); Hiroki Tashiro, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/389,306

(22) Filed: Apr. 19, 2019

(65) Prior Publication Data

US 2019/0356263 A1 Nov. 21, 2019

(30) Foreign Application Priority Data

May 15, 2018 (JP) ................................ 2018-093860

(51) Int. Cl.
*H02P 29/032* (2016.01)
*B60W 10/08* (2006.01)
*H02K 11/04* (2016.01)
*H02P 27/08* (2006.01)
*H02K 47/04* (2006.01)

(52) U.S. Cl.
CPC ........... *H02P 29/032* (2016.02); *B60W 10/08* (2013.01); *H02K 11/048* (2013.01); *H02P 27/08* (2013.01); *H02K 47/04* (2013.01)

(58) Field of Classification Search
CPC .............................. H02P 29/032; B60W 10/08
USPC .......................................................... 361/23
See application file for complete search history.

(56) References Cited

U.S. PATENT DOCUMENTS

| 9,106,174 | B2 | 8/2015 | Sekiya et al. |
| 9,469,185 | B2 | 10/2016 | Okada et al. |
| 2014/0232304 | A1* | 8/2014 | Sekiya ...................... H02P 3/18 |
| | | | 318/400.02 |
| 2014/0297085 | A1* | 10/2014 | Hayashi ................ B60L 15/007 |
| | | | 701/22 |
| 2017/0264229 | A1 | 9/2017 | Murata et al. |

FOREIGN PATENT DOCUMENTS

| JP | 2009280033 A | 12/2009 |
| JP | 2013-013280 A | 1/2013 |
| JP | 2013013198 A | 1/2013 |
| JP | 2017-056850 A | 3/2017 |
| JP | 2017-163728 A | 9/2017 |

OTHER PUBLICATIONS

Lee, H., et al., "Coasting Control of EV Motor Considering Cross Coupling Inductance", 2016 IEEE Energy Conversion Congress and Exposition, 2016, 6 pages.

* cited by examiner

*Primary Examiner* — Erick D Glass
(74) *Attorney, Agent, or Firm* — Sughrue Mion, PLLC (57) ABSTRACT

The vehicle includes an AC motor generator (MG) connected to a driving wheel, a battery, an inverter configured to convert DC power supplied from the battery to AC power and supply the AC power to the MG, and a vehicle ECU configured to control the inverter. The vehicle ECU performs a zero torque control to drive the inverter so that the output torque from the MG is zero when the battery is prohibited from being charged while the MG is being driven to rotate by the motive power from the driving wheel.

7 Claims, 6 Drawing Sheets

[ THREE-PHASE ON CONTROL ]

FIG.3

[ ZERO TORQUE CONTROL ]

DRIVE DEVICE AND CONTROL METHOD FOR VEHICLE

This non-provisional application is based on Japanese Patent Application No. 2018-093860 filed on May 15, 2018 with the Japan Patent Office, the entire contents of which are hereby incorporated by reference.

BACKGROUND

Field

The present disclosure relates to the control of a vehicle equipped with an AC rotating electrical machine connected to a driving wheel.

Description of the Background Art

Japanese Patent Laying-Open No. 2017-163728 discloses a vehicle equipped with an AC motor connected to a driving wheel, a battery, and an inverter configured to convert DC power supplied from the battery into AC power and supply the AC power to the motor.

In the vehicle, when a malfunction that a current can not flow from the motor to the battery occurs (i.e., when the battery is prohibited from being charged) and when the rotation speed of the motor during the regeneration is equal to or higher than a predetermined value (i.e., when it is predicted that the counter electromotive voltage is greater than the voltage of the battery), a three-phase ON control is performed to bring three phase arms of the inverter into a conductive state. As a result, the regenerative current generated during the regeneration of the motor circulates between the motor and the inverter without being supplied to the battery. Therefore, the battery is prevented from being charged by the regenerative current from the motor.

SUMMARY

Although in the three-phase ON control described above, the regenerative current is prevented from being supplied to the battery, since the regenerative current flows through the inverter, it is concerned that the inverter may become overheated due to Joule heat. Therefore, it is desired to develop a technology capable of preventing the battery from being charged and preventing the inverter from becoming overheated.

The present disclosure has been made to solve the aforementioned problem, and an object thereof is to prevent a power storage device from being charged by the regenerative power and prevent the inverter from becoming overheated when the power storage device is prohibited from being charged while a rotating electrical machine is being driven to rotate by the motive power from a driving wheel.

(1) A drive device according to the present disclosure is a drive device for a vehicle equipped with an AC rotating electrical machine connected to a driving wheel, and includes a power storage device, an inverter configured to convert DC power supplied from the power storage device to AC power and supply the AC power to the rotating electrical machine, and a control device configured to control the inverter.

the control device is configured to perform a zero torque control to drive the inverter so that the output torque from the rotating electrical machine is zero when the power storage device is prohibited from being charged while the rotating electrical machine is being driven to rotate by the motive power from the driving wheel.

According to the drive device described above, when the power storage device is prohibited from being charged while the rotating electrical machine is being driven to rotate by the motive power from the driving wheel, a zero torque control is performed to drive the inverter so that the output torque from the rotating electrical machine is zero (i.e., a PWM (Pulse Width Modulation) control is performed on the inverter so that the q-axis current flowing through the rotating electrical machine is zero). Thereby, when the rotating electrical machine is being driven to rotate by the motive power from the driving wheel, the rotating electrical machine does not generate any regenerative torque, and thus no regenerative power is generated. Thus, the power storage device is prevented from being charged by the regenerative power, and the regenerative current is prevented from flowing through the inverter. As a result, the power storage device is prevented from being charged by the regenerative power, and the inverter is prevented from becoming overheated.

(2) In one embodiment, the control device is configured to perform the zero torque control when the power storage device is prohibited from being charged while the rotating electrical machine is being driven to rotate by the motive power from the driving wheel and when it is determined that the power lost by the inverter is greater than the regenerative power from the rotating electrical machine during the zero torque control.

If the output torque from the rotating electrical machine is exactly equal to zero as desired as a result of the zero torque control, the rotating electrical machine does not generate any regenerative power. However, if, for example, an error is present in the detection value by the resolver that detects the rotation angle of the rotating electrical machine, the output torque from the rotating electrical machine is not equal to zero during the zero torque control but shifts to the regeneration side, and thereby, a very small amount of regenerative power may be generated.

In view of this point, in the above embodiment, the zero torque control is performed when it is determined (judged) that the power lost by the inverter is greater than the regenerative power from the rotating electrical machine during the zero torque control. Therefore, even though the regenerative power is generated during the zero torque control, the regenerative power is lost as heat by the inverter and will not supplied to the power storage device. Thus, it is possible to perform the zero torque control while ensuring that the power storage device is not charged by the regenerative power during the zero torque control.

(3) In one embodiment, the inverter is electrically connected between the power storage device and the rotating electrical machine, and is provided with three-phase drive arms, each of which includes an upper arm and a lower arm. When the power storage device is prohibited from being charged while the rotating electrical machine is being driven to rotate by the motive power from the driving wheel and when it is determined that the power lost by the inverter is not greater than the regenerative power from the rotating electrical machine during the zero torque control, the control device performs a three-phase ON control to maintain the upper arm or the lower arm of each three-phase drive arm of the inverter in a conductive state.

If the regenerative power from the rotating electrical machine is greater than the power lost by the inverter during the zero torque control, a part of the regenerative power may be supplied to the power storage device without being lost by the inverter.

In view of this point, in the above embodiment, when it is determined (judged) that the power lost by the inverter is not greater than the regenerative power from the rotating electrical machine during the zero torque control, a three-phase ON control will be performed instead of the zero torque control. Thus, at the time when the power storage device is prohibited from being charged, it is possible to prevent the power storage device from being charged by the regenerative power more reliably.

(4) In one embodiment, the control device determines that the power lost by the inverter is greater than the regenerative power from the rotating electrical machine during the zero torque control when the rotation speed of the rotating electrical machine is less than a threshold value, and determines that the power lost by the inverter is not greater than the regenerative power from the rotating electrical machine during the zero torque control when the rotation speed of the rotating electrical machine is greater than the threshold value.

According to the above embodiment, it is possible to determine (judge) whether or not the power lost by the inverter is greater than the regenerative power from the rotating electrical machine during the zero torque control based on a result of comparison between the rotation speed of the rotating electrical machine and the threshold value.

(5) In one embodiment, when the power storage device is prohibited from being charged while the rotating electrical machine is being driven to rotate by the motive power from the driving wheel and when the counter electromotive voltage of the rotating electrical machine is less than the voltage of the power storage device, the control device performs a shutoff control to bring the inverter into a gate shutoff state.

When the counter electromotive voltage of the rotating electrical machine is less than the voltage of the power storage device, no regenerative current flows from the rotating electrical machine to the power storage device if the inverter is set to the gate shutoff state. Therefore, in the above embodiment, when the counter electromotive voltage of the rotating electrical machine is less than the voltage of the power storage device, a shutoff control is performed to bring the inverter into a gate shutoff state. Thus, compared with the case where the zero torque control is performed, it is possible to prevent the power storage device from being charged by the regenerative power more reliably.

(6) In one embodiment, when the power storage device is prohibited from being charged while the rotating electrical machine is being driven to rotate by the motive power from the driving wheel and when it is determined that the power lost by the inverter is greater than the regenerative power from the rotating electrical machine during the zero torque control, the control device performs the three-phase ON control if it is detected that the power storage device is being charged.

According to the above embodiment, when it is detected that the power storage device is being charged, the three-phase ON control is performed. As a result, the regenerative current flows between the rotating electrical machine and the inverter without being supplied to the power storage device, and thereby, the power storage device is prevented from being charged.

(7) In one embodiment, when the power storage device is prohibited from being charged while the rotating electrical machine is being driven to rotate by the motive power from the driving wheel and when it is determined that the power lost by the inverter is not greater than the regenerative power from the rotating electrical machine during the zero torque control, the control device performs the zero torque control if it is detected that the rotating electrical machine or the inverter is overheated.

According to the above embodiment, when it is detected that the rotating electrical machine or the inverter is overheated, the zero torque control is performed. As a result, the current flowing through the rotating electrical machine and the inverter is reduced, and thereby, the rotating electrical machine or the inverter is prevented from becoming overheated.

(8) A control method according to the present disclosure is a control method for controlling a vehicle which is equipped with an AC rotating electrical machine connected to a driving wheel, a power storage device, an inverter configured to convert DC power supplied from the power storage device to AC power and supply the AC power to the rotating electrical machine. The control method includes determining whether or not the power storage device is prohibited from being charged while the rotating electrical machine is being driven to rotate by the motive power from the driving wheel, and performing a zero torque control to drive the inverter so that the output torque from the rotating electrical machine is zero when the power storage device is prohibited from being charged while the rotating electrical machine is being driven to rotate by the motive power from the driving wheel.

According to the above method, when the power storage device is prohibited from being charged while the rotating electrical machine is being driven to rotate by the motive power from the driving wheel, a zero torque control is performed to drive the inverter so that the output torque from the rotating electrical machine is zero (i.e., a PWM control is performed on the inverter so that the q-axis current flowing through the rotating electrical machine is zero). Thereby, even when the rotating electrical machine is being driven to rotate by the motive power from the driving wheel, the rotating electrical machine does not generate any regenerative torque, and thus no regenerative power is generated. Thus, the power storage device is prevented from being charged by the regenerative power, and the regenerative current is prevented from flowing through the inverter. As a result, the power storage device is prevented from being charged by the regenerative power, and the inverter is prevented from becoming overheated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present disclosure will be described in detail with reference to the drawings. In the drawings, the same or corresponding parts are denoted by the same reference numerals, and the description thereof will not be repeated.

Figure 1:
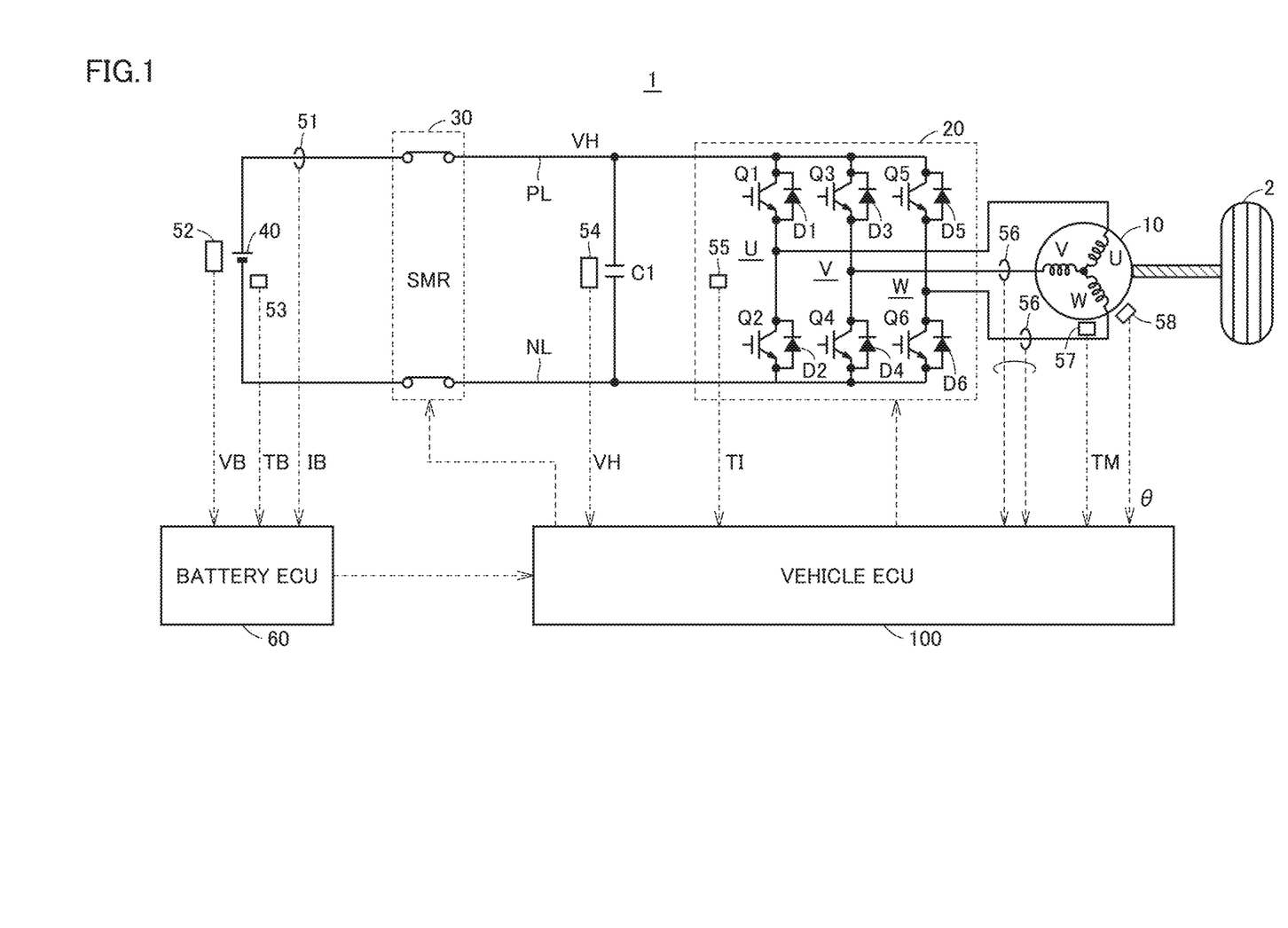
FIG. 1 is a block diagram schematically illustrating an example of the overall configuration of a vehicle.

FIG. 1 is a block diagram schematically illustrating an example of the overall configuration of a vehicle 1 equipped with a drive device according to the present embodiment. The vehicle 1 includes a driving wheel 2, an MG (Motor Generator) 10, an inverter 20, an SMR (System Main Relay) 30, a battery 40, a battery ECU (Electronic Control Unit) 60, and a vehicle ECU 100.

The vehicle 1 is configured to travel by the motive power transmitted from the MG 10 to the driving wheel 2. In addition to the MG 10, the vehicle 1 may include an engine (not shown) as a driving source.

The MG 10 is a permanent magnet type three-phase AC motor including a permanent magnet in the rotor. The rotor of the MG 10 is mechanically connected to the driving wheel 2. Although not shown in FIG. 1, generally a gear system (a speed reducer or the like) is disposed between the MG 10 and the driving wheel 2.

The MG 10 is provided with a temperature sensor 57 and a resolver 58. The temperature sensor 57 is configured to detect a temperature (motor temperature) TM of the MG 10 and output a signal indicating the detection result to the vehicle ECU 100. The resolver 58 is configured to detect a rotation angle (motor rotation angle) 0 of the rotor of the MG 10 and output a signal indicating the detection result to the vehicle ECU 100.

The inverter 20 includes three-phase drive arms (U-phase arm U, V-phase arm V, W-phase arm W). The three phase arms are connected in parallel to each other between power lines PL and NL. The U-phase arm U includes switching elements Q1 and Q2 connected in series, the V-phase arm V includes switching elements Q3 and Q4 connected in series, and the W-phase arm W includes switching elements Q5 and Q6. Diodes D1 to D6 are connected in anti-parallel to switching elements Q1 to Q6, respectively.

The midpoint of each phase arm is connected to a corresponding phase coil of the MG 10. In other words, one end of the U-phase coil is connected to a midpoint between the switching elements Q1 and Q2, one end of the V-phase coil is connected to a midpoint between the switching elements Q3 and Q4, and one end of the W-phase coil is connected to a midpoint between the switching elements Q5 and Q6. The other end of the U-phase coil, the other end of the V-phase coil and the other end of the W-phase coil are connected to each other to form a neutral point.

The inverter 20 is provided with a temperature sensor 55. The temperature sensor 55 is configured to detect a temperature TI of the inverter 20 and output a signal indicating the detection result to the vehicle ECU 100. A current sensor 56 is configured to detect a phase current flowing between the inverter 20 and the MG 10 and output a signal indicating the detection result to the vehicle ECU 100.

The inverter 20 is connected to the battery 40 via the power lines PL and NL. A capacitor C1 is connected between the power line PL and the power line NL. The capacitor C1 is configured to smooth the fluctuation of a voltage (system voltage VH) across the power line PL and the power line NL.

A voltage sensor 54 is configured to detect a voltage across the capacitor C1, in other words, the system voltage VH, and output a signal indicating the detection result to the vehicle ECU 100.

The SMR 30 is interposed between the battery 40 and the inverter 20 and connected between the power lines PL and NL. The SMR 30 is configured to switch a conductive state (ON) and a shutoff state (OFF) between the battery 40 and the inverter 20 in response to a control signal from the vehicle ECU 100.

The battery 40 is illustrated as a representative example of a rechargeable power storage device. The battery 40 is typically a secondary battery such as a nickel hydrogen secondary battery or a lithium ion secondary battery. A capacitor such as an electric double-layer capacitor may be used as the power storage device instead of the battery 40.

The battery 40 is provided with a current sensor 51, a voltage sensor 52, and a temperature sensor 53. The current sensor 51 is configured to detect a current (battery current) IB flowing through the battery 40. The voltage sensor 52 is configured to detect a voltage (battery voltage) VB of the battery 40. The temperature sensor 53 is configured to detect a temperature (battery temperature) TB of the battery 40. Each sensor is configured to output a signal indicating the detection result to the battery ECU 60.

The battery ECU 60 includes a CPU (Central Processing Unit), a memory, an input/output buffer, and the like. The battery ECU 60 is configured to monitor the state of the battery 40 based on the detection results (the battery current IB, the battery voltage VB and the battery temperature TB) from the current sensor 51, the voltage sensor 52 and the temperature sensor 53, respectively, and output a signal indicating the monitoring result of the battery 40 to the vehicle ECU 100.

For example, when at least one of the battery current IB, the battery voltage VB and the battery temperature TB is an abnormal value beyond a predetermined normal range, it is assumed that at least one of the battery 40, the current sensor 51, the voltage sensor 52 and the temperature the sensor 53 has failed, the battery ECU 60 determines that the battery 40 should be prohibited from being charged in order to prevent the battery 40 from being overcharged. It should be noted that the battery 40 should be prohibited from being charged when the battery voltage VB is close to a full charged voltage although it is within the normal range. When it is determined that the battery 40 should be prohibited from being charged, the battery ECU 60 outputs a charging prohibition request to the vehicle ECU 100.

The vehicle ECU 100 includes a CPU, a memory, an input/output buffer, and the like. Based on a signal from each of the voltage sensor 54, the temperature sensors 55, 57, the current sensor 56 and the resolver 58 as well as a map and a program stored in the memory, the vehicle ECU 100 controls the inverter 20 so as to make the vehicle 1 run as desired. Note that the control of the vehicle ECU 100 is not limited to be processed by software, it may be processed by dedicated hardware (electronic circuit).

The vehicle ECU 100 determines whether to set the control mode of the MG 10 to a power running mode or a regenerating mode based on a vehicular speed and an amount of operation on an accelerator pedal by the user.

In the power running mode, the vehicle ECU 100 controls the inverter 20 so as to convert DC power from the battery 40 into AC power and supply the AC power to the MG 10.

Thus, the MG 10 is in the power running state (a state in which the MG 10 is driven to rotate by the electric power from the battery 40), and transmits the power running torque to the driving wheel 2.

When the battery 40 is not prohibited from being charged in the regenerating mode (i.e., when the charging prohibition request is not received from the battery ECU 60), the vehicle ECU 100 controls the inverter 20 so as to make the MG 10 generate the regenerative power during a state (hereinafter also referred to as "regenerating state") in which the MG 10 is driven to rotate by the motive power from the driving wheel 2 to generate a counter electromotive voltage. As a result, the MG 10 transmits a regenerative torque (braking torque) corresponding to the regenerative power to the driving wheel 2. The regenerative power is converted into DC power and supplied to the battery 40 by the inverter 20.

Although the battery ECU 60 and the vehicle ECU 100 are illustrated as being arranged separately in FIG. 1, the two ECUs may be integrated into a single functional unit.

<Fail-Safe Control when the Battery is Prohibited from being Charged>

When the battery 40 should be prohibited from being charged (i.e., when it is determined by the battery ECU 60 that the battery 40 should be prohibited from being charged) due to a failure in the battery 40 or the like, it is desired that the regenerative power of the MG 10 is not supplied to the battery 40. On the other hand, even when the battery 40 is prohibited from being charged, in order to make the vehicle 1 run in the fail-safe mode, it is desired that the SMR 30 is maintained at the ON state so as to allow the electric power to be discharged from the battery 40 to the MG 10.

Therefore, when the battery 40 is prohibited from being charged (i.e., when the charging prohibition request is received from the battery ECU 60), the vehicle ECU 100 according to the present embodiment performs a fail-safe control on the inverter 20 to maintain the SMR 30 at the ON state so as to allow the battery 40 to be discharged but prevent the battery 40 from being charged.

During the fail-safe control, in order to prevent the SMR 30 from being switched between the ON state and the OFF state complicatedly, the SMR 30 is constantly maintained at the ON state regardless of whether the MG 10 is in the power running state or in the regenerating state. Therefore, when the MG 10 is in the regenerating mode, it is required to control the inverter 20 so as to prevent the battery 40 from being charged.

Figure 2:
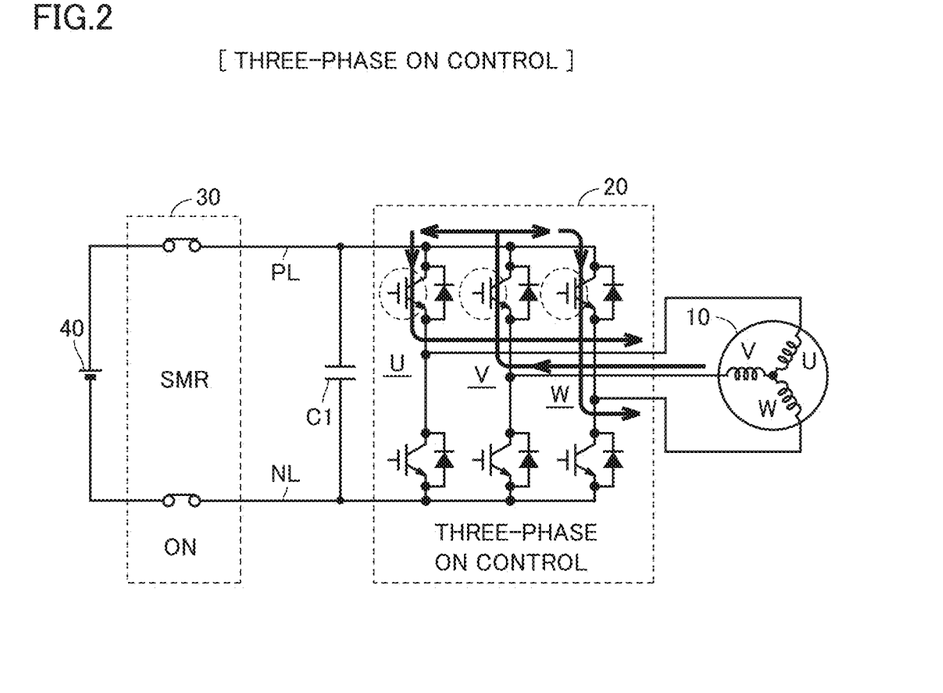
FIG. 2 is a diagram illustrating an example of a circuit state when a three-phase ON control is being performed.

FIG. 2 is a diagram illustrating an example of a circuit state when a three-phase ON control is performed on the inverter 20 while the MG 10 is being driven to rotate by the motive power from the driving wheel 2 (i.e., in a regenerating state). The three-phase ON control is a control configured to maintain the upper arm (switching elements Q1, Q3, Q5) for each of three phases of the inverter 20 in a conductive state. Note that the three-phase ON control may be a control configured to maintain the lower arm (switching elements Q2, Q4, Q6) for each of three phases of the inverter 20 in a conductive state.

When the rotor of the MG 10 is rotated by the driving wheel 2, a counter electromotive voltage (counter electromotive power) Vc is generated in the MG 10. Due to the three-phase ON control, a regenerative current resulting from the counter electromotive voltage Vc can flow through the upper arm for each of the three phases of the inverter 20 in both directions. Therefore, the regenerative current circulates between the MG 10 and the inverter 20 without being supplied to the battery 40 having a large resistance. Thereby, the battery 40 is prevented from being charged by the regenerative power of the MG 10.

Although in the three-phase ON control described above, the regenerative current is prevented from being supplied to the battery 40, since the regenerative current flows through the inverter 20, it is concerned that the inverter may become overheated due to Joule heat. Therefore, it is desired that the battery 40 is prevented from being charged and the inverter 20 is prevented from becoming overheated.

Therefore, the vehicle ECU 100 according to the present embodiment performs the zero torque control on the inverter 20 when the battery 40 is prohibited from being charged while the MG 10 is being driven to rotate by the motive power from the driving wheel 2.

The zero torque control is a control to drive the inverter 20 so that the output torque from the MG 10 is zero. Generally, a d-q axis rotary coordinate system constituted by a magnetic flux direction (d axis) of the permanent magnet of the rotor and a direction (q axis) orthogonal to the magnetic flux direction is used in the control of the MG 10. In the zero torque control according to the present embodiment, the inverter 20 is driven by the PWM control so that a current command value in the q axis direction contributing to the output torque from the MG 10 is zero in the d-q axis rotary coordinate system based on the motor rotation angle θ which is the detection value by the resolver 58.

Figure 3:
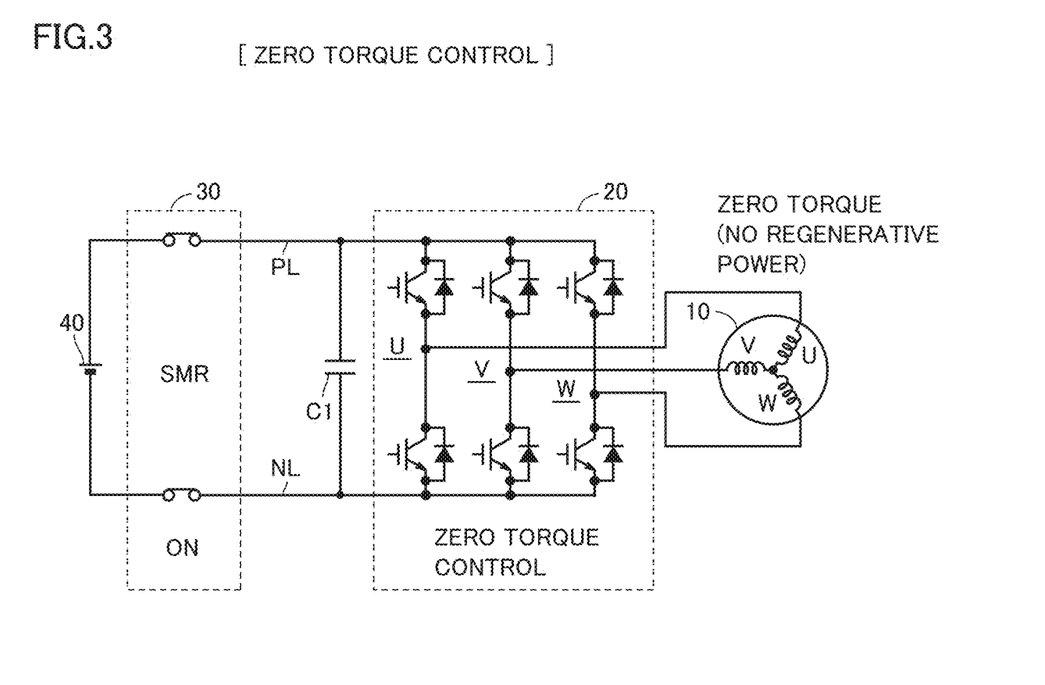
FIG. 3 is a diagram illustrating an example of a circuit state when a zero torque control is being performed.

FIG. 3 is a diagram illustrating an example of a circuit state when the zero torque control is performed on the inverter 20 while the MG 10 is being driven to rotate by the motive power from the driving wheel 2.

Even when the MG 10 is being driven to rotate by the motive power from the driving wheel 2, if the zero torque control is performed, the MG 10 is prevented from generating the regenerative torque, and thereby, no regenerative power is generated. Therefore, the battery 40 is prevented from being charged by the regenerative power, and the regenerative current is prevented from flowing through the inverter 20. As a result, the battery 40 is prevented from being charged by the regenerative power, and the inverter 20 is prevented from becoming overheated.

If the output torque from the MG 10 is exactly equal to zero as desired as a result of the zero torque control, the MG 10 does not generate any regenerative power. However, if an error is present in the motor rotation angle θ detected by the resolver 58 due to the fact that the installation position of the resolver 58 is deviated from a predetermined reference position (resolver misalignment), the output torque from the MG 10 does not become zero during the zero torque control but shifts to the regeneration side, and thereby, a very small amount of regenerative power may be generated.

In view of this point, when the battery 40 is prohibited from being charged while the MG 10 is being driven to rotate by the motive power from the driving wheel 2, the vehicle ECU 100 according to the present embodiment performs the zero torque control while ensuring that the regenerative power that may be generated due to the resolver misalignment during the zero torque control is lost as heat by the inverter 20.

Specifically, the vehicle ECU 100 calculates the regenerative power generated by the MG 10 due to an error in the motor rotation angle θ that is caused by the resolver misalignment during the zero torque control (hereinafter referred to as "the regenerative power generated due to the resolver misalignment during the zero torque control" or simply as "the regenerative power during the zero torque control") and the electric power that is lost as heat by the inverter 20 during the zero torque control (hereinafter also referred to as "the lost power during the zero torque control") by using the rotation speed of the MG 10 (hereinafter referred to as "the motor rotation speed NM") or the vehicle speed as a parameter. Then, the vehicle ECU 100 compares the regenerative power generated due to the resolver misalignment during the zero torque control with the lost power during the zero torque control. The motor rotation speed NM may be calculated, for example, from the cycle of the motor rotation angle θ which is the detection value by the resolver 58.

When the lost power during the zero torque control is greater than the regenerative power generated due to the resolver misalignment during the zero torque control, the vehicle ECU 100 performs the zero torque control. Therefore, even if the regenerative power is generated due to the resolver misalignment during the zero torque control, the regenerative power is lost as heat by the inverter 20 without being supplied to the battery 40. As a result, it is possible to prevent the battery 40 from being charged by the regenerative power generated due to the resolver misalignment during the zero torque control more appropriately.

On the other hand, when the lost power during the zero torque control is smaller than the regenerative power generated due to the resolver misalignment during the zero torque control, even if the zero torque control is performed, a part of the regenerative power generated due to the resolver misalignment may be supplied to the battery 40 without being lost by the inverter 20. Therefore, the vehicle ECU 100 performs the three-phase ON control instead of the zero torque control. As a result, it is possible to prevent the battery 40 from being charged by the regenerative power generated due to the resolver misalignment more reliably.

Furthermore, when the counter electromotive voltage Vc of the MG 10 is less than the battery voltage VB, even if all the arms (switching elements Q1 to Q6) of the inverter 20 are maintained at the nonconductive state, the regenerative current will not flow from the MG 10 to the battery 40. In view of this point, when the counter electromotive voltage Vc of the MG 10 is less than the battery voltage VB, the vehicle ECU 100 according to the present embodiment performs the gate shutoff control to maintain all the arms of the inverter 20 at the nonconductive state.

Figure 4:
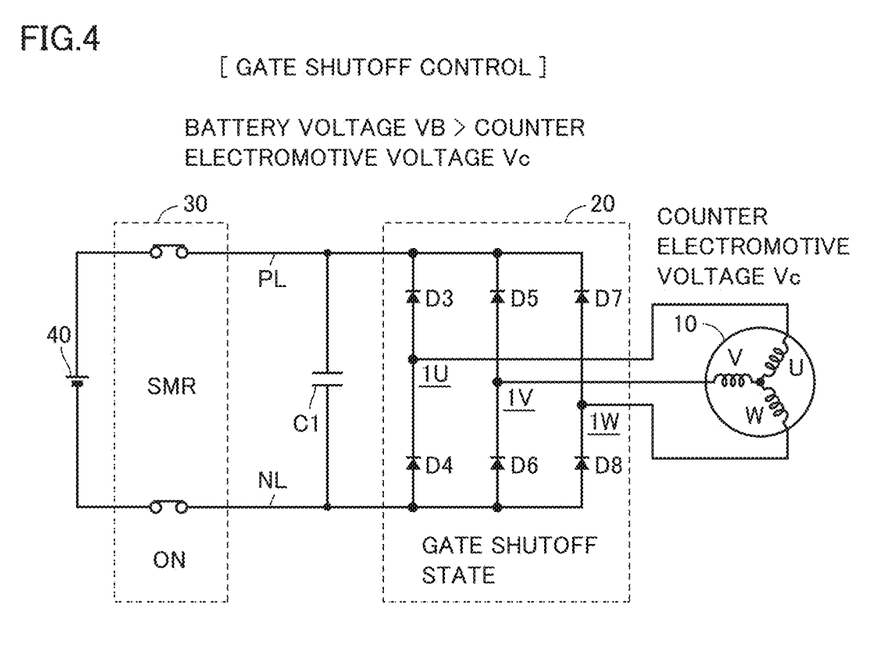
FIG. 4 is a diagram illustrating an example of a circuit state when a gate shutoff control is being performed.

FIG. 4 is a diagram illustrating an example of a circuit state when the gate shutoff control is performed on the inverter 20 when the counter electromotive voltage Vc of the MG 10 is less than the battery voltage VB. When the gate shutoff control is performed, the counter electromotive voltage Vc is applied to the battery 40 via the diodes D1, D3 and D5 of the inverter 20, but since the counter electromotive voltage Vc is less than the battery voltage VB, no current will flow in the direction from the MG 10 toward the battery 40. Thus, the battery 40 is prevented from being charged by the regenerative power and the inverter 20 is prevented from becoming overheated more appropriately.

Both the counter electromotive voltage Vc of the MG 10 and the regenerative power generated due to the resolver misalignment have such a characteristic that each increases as the motor rotation speed NM increases. In view of this point, when the battery 40 is prohibited from being charged while the MG 10 is being driven to rotate by the motive power from the driving wheel 2, the vehicle ECU 100 according to the present embodiment determines which one of the zero torque control, the three-phase ON control and the gate shutoff control should be performed by using the motor rotation speed NM as a parameter.

Figure 5:
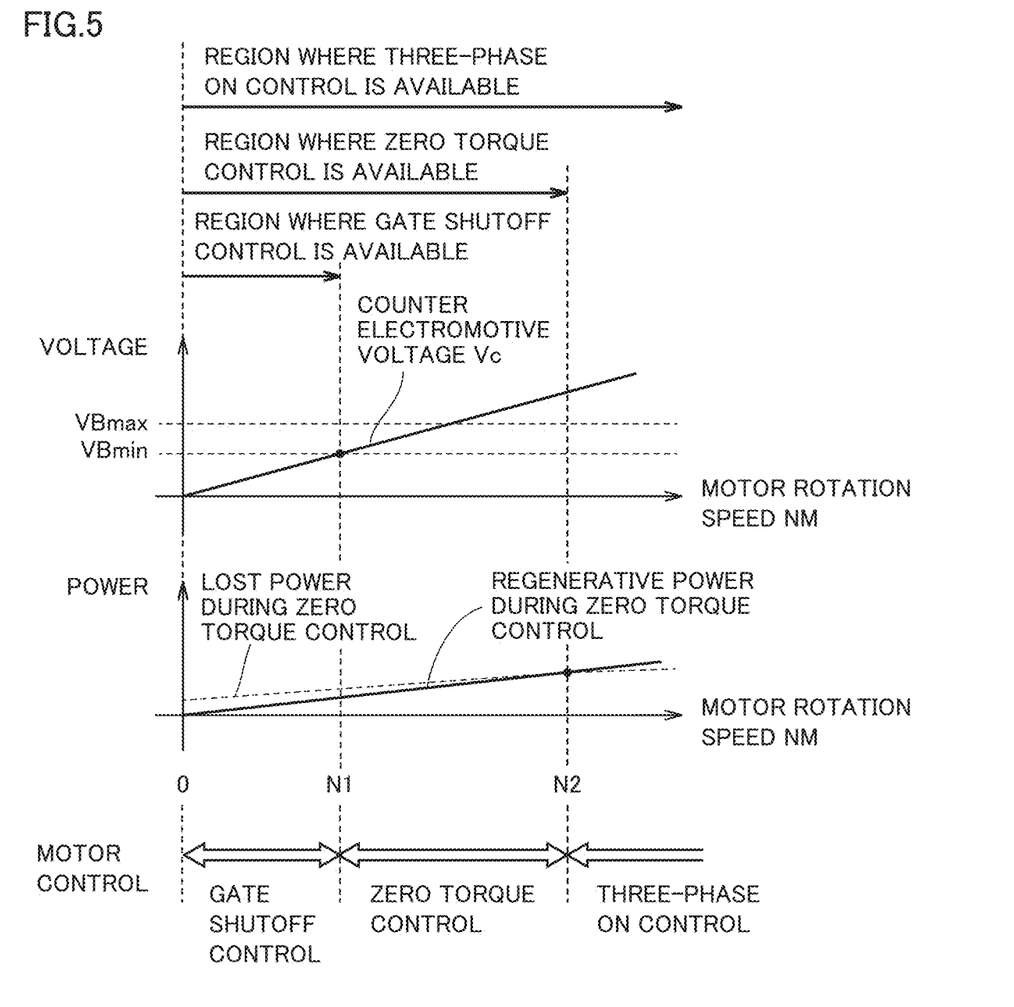
FIG. 5 is a diagram illustrating an example of the relationship between the counter electromotive voltage Vc of MG and the regenerative power generated due to the resolver misalignment and the motor rotation speed NM.

FIG. 5 is a diagram illustrating an example of the relationship between the counter electromotive voltage Vc of the MG 10 and the regenerative power generated due to the resolver misalignment during the zero torque control and the motor rotation speed NM.

The counter electromotive voltage Vc of the MG 10 has such a characteristic that it increases as the motor rotation speed NM increases. On the other hand, the battery voltage VB may fluctuate between a minimum value VBmin and a maximum value VBmax in response to the charged amount of the battery 40. Therefore, for example, the motor rotation speed NM at the time when the counter electromotive voltage Vc is equal to the minimum value VBmin of the battery voltage is obtained by experiments or the like, and stored in advance in the memory as a first threshold value N1. Thereby, whether or not the counter electromotive voltage Vc is less than the battery voltage VB may be determined (judged) based on the result of comparison between the motor rotation speed NM calculated from the detection value by the resolver 58 and the first threshold value N1 stored in the memory (see the upper part of FIG. 5).

The regenerative power generated due to the resolver misalignment during the zero torque control also has such a characteristic that it increases as the motor rotation speed NM increases. The lost power during the zero torque control occurs even when the motor rotation speed NM is 0 and increases as the motor rotation speed NM increases, but the increment (increasing gradient) of the lost power during the zero torque control when the motor rotation speed NM increases by a unit amount is smaller than the increment (increasing gradient) of the regenerative power generated due to the resolver misalignment during the zero torque control when the motor rotation speed NM increases by a unit amount. Therefore, for example, the motor rotation speed NM at the time when the regenerative power generated due to the resolver misalignment during the zero torque control is equal to the lost power during the zero torque control is obtained by experiments or the like, and stored in advance as a second threshold value N2. Thereby, whether or not the regenerative power generated due to the resolver misalignment during the zero torque control is greater than the lost power during the zero torque control may be determined (judged) based on the result of comparison between the motor rotation speed NM calculated from the detection value by the resolver 58 and the second threshold value N2 stored in the memory (see the lower part of FIG. 5).

As illustrated in FIG. 5, since the regenerative power generated due to the resolver misalignment during the zero torque control is very small, normally, the second threshold value N2 (i.e., the motor rotation speed NM at the time when the regenerative power generated due to the resolver misalignment during the zero torque control) is greater than the first threshold value N1 (i.e., the motor rotation speed NM at the time when the counter electromotive voltage Vc is equal to the minimum value VBmin of the battery voltage) as illustrated in FIG. 5.

In a region where the motor rotation speed NM is equal to or greater than the first threshold value N1 but less than the second threshold value N2, even if the regenerative power is generated due to the resolver misalignment during the zero torque control, the regenerative power may be lost as heat by the inverter 20 without being supplied to the battery 40, the vehicle ECU 100 performs the zero torque control.

In a region where the motor rotation speed NM is equal to or greater than the second threshold value N2, even if the zero torque control is performed, a part of the regenerative power generated due to the resolver misalignment may be supplied to the battery 40 without being lost by the inverter 20, the vehicle ECU 100 performs the three-phase ON control instead of the zero torque control.

Furthermore, in a region where the motor rotation speed NM is less than the first threshold value N1, even if all the arms of the inverter 20 are maintained at the nonconductive state, the regenerative current may not flow from the MG 10 to the battery 40, the vehicle ECU 100 performs the gate shutoff control.

Figure 6:
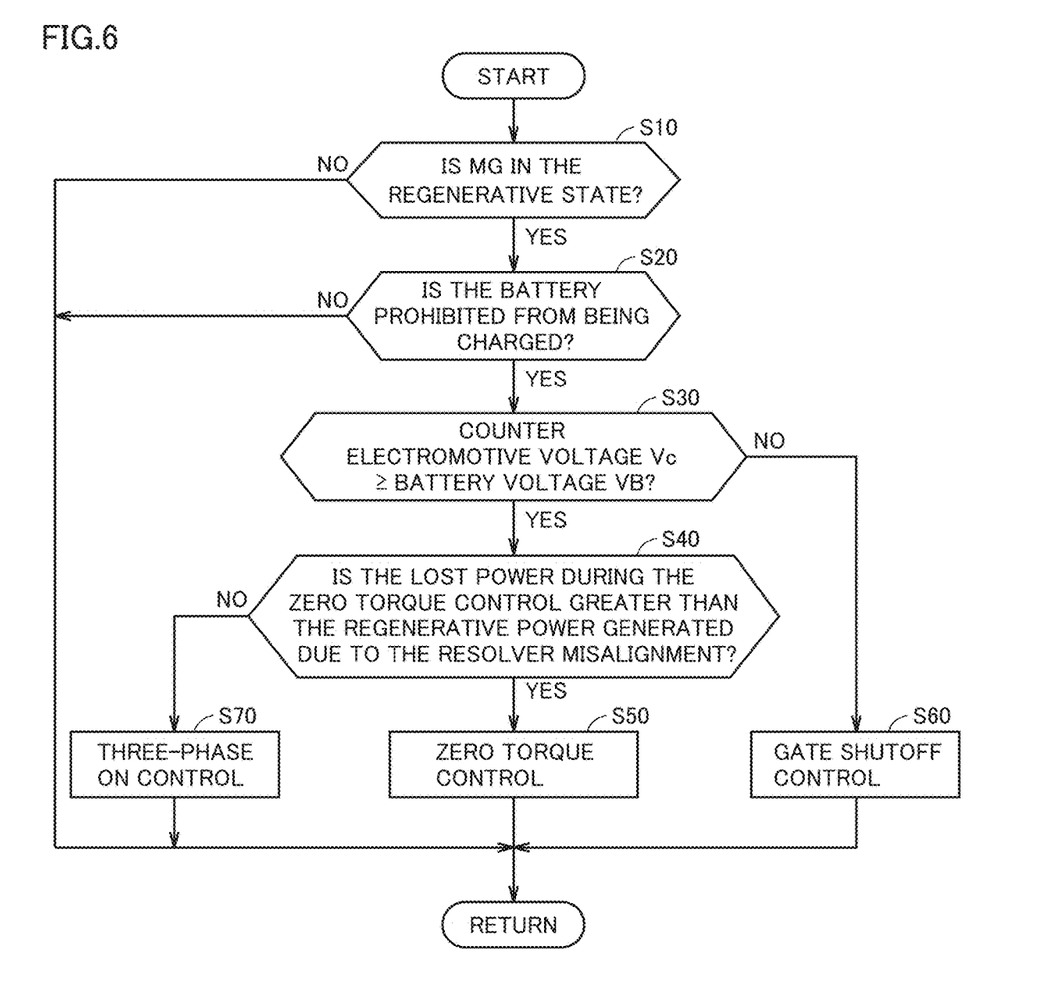
FIG. 6 is a flowchart illustrating an example of a process to be performed by the vehicle ECU.

FIG. 6 is a flowchart illustrating an example of a process to be performed by the vehicle ECU 100. This flowchart is repeatedly performed each time when, for example, a predetermined condition is satisfied.

The vehicle ECU 100 determines whether or not the MG 10 is in a regenerative state (i.e., a state in which the MG 10 is being driven to rotate by the motive power from the driving wheel 2) (step S10). When it is determined that the MG 10 is not in the regenerative state (NO in step S10), the vehicle ECU 100 skips the subsequent steps and proceeds to return.

When it is determined that the MG 10 is in the regenerative state (YES in step S10), the vehicle ECU 100 determines whether or not the battery 40 is prohibited from being charged (step S20). The vehicle ECU 100 determines that the battery 40 is prohibited from being charged when the vehicle ECU 100 receives a charging prohibition request from the battery ECU 60.

When it is determined that the battery 40 is not prohibited from being charged (NO in step S20), the vehicle ECU 100 skips the subsequent steps and proceeds to return. In this case, as described above, a normal control is performed on the inverter 20 so as to make the MG 10 generate the regenerative power.

When it is determined that the battery 40 is prohibited from being charged (YES in step S20), the vehicle ECU 100 determines whether or not the counter electromotive voltage Vc of the MG 10 is equal to or greater than the battery voltage VB (step S30). In the present embodiment, as described above with reference to FIG. 5, when the motor rotation speed NM calculated from the detection value by the resolver 58 is equal to or greater than the first threshold value N1 (i.e., the motor rotation speed NM at the time when the counter electromotive voltage Vc is equal to the minimum value VBmin of the battery voltage), the vehicle ECU 100 determines that the counter electromotive voltage Vc is equal to greater than the battery voltage VB. The method for determining whether or not the counter electromotive voltage Vc is equal to or greater than the battery voltage VB is not limited to the above method. For example, the counter electromotive voltage Vc of the MG 10 may be calculated from the motor rotation speed NM calculated from the detection value by the resolver 58, and whether or not the calculated counter electromotive voltage Vc is equal to greater than the battery voltage VB detected by the voltage sensor 52 may be determined by comparison.

When it is determined that the counter electromotive voltage Vc is less than the battery voltage VB (NO in step S30), the vehicle ECU 100 performs the gate shutoff control on the inverter 20 (step S60).

When it is determined that the counter electromotive voltage Vc is equal to or greater than the battery voltage VB (YES in step S30), the vehicle ECU 100 determines whether or not the lost power during the zero torque control is greater than the regenerative power generated due to the resolver misalignment (step S40). For example, as described above with reference to FIG. 5, when the motor rotation speed NM is less than the second threshold value N2, the vehicle ECU 100 determines that the lost power during the zero torque control is greater than the regenerative power generated due to the resolver misalignment.

When it is determined that the lost power during the zero torque control is greater than the regenerative power generated due to the resolver misalignment (YES in step S40), the vehicle ECU 100 performs the zero torque control on the inverter 20 (step S50).

When it is determined that the lost power during the zero torque control is smaller than the regenerative power generated due to the resolver misalignment (NO in step S40), the vehicle ECU 100 performs the three-phase ON control on the inverter 20 (step S70).

As described above, when the battery 40 is prohibited from being charged while the MG 10 is being driven to rotate by the motive power from the driving wheel 2, the vehicle ECU 100 according to the present embodiment performs the zero torque control on the inverter 20. Thereby, even when the MG 10 is being driven to rotate by the motive power from the driving wheel 2, the MG 10 does not generate any regenerative torque, and thus no regenerative power is generated. Therefore, the battery 40 is prevented from being charged by the regenerative power, and the regenerative current is prevented from flowing through the inverter 20. As a result, the battery 40 is prevented from being charged by the regenerative power, and the inverter 20 is prevented from becoming overheated.

In particular, when the battery 40 is prohibited from being charged while the MG 10 is being driven to rotate by the motive power from the driving wheel 2 and when the lost power during the zero torque control is greater than the regenerative power generated due to the resolver misalignment, the zero torque control is performed. Therefore, even if the regenerative power is generated due to the resolver misalignment during the zero torque control, the regenerative power is lost as heat by the inverter 20 without being supplied to the battery 40. Thus, it is possible to perform the zero torque control while ensuring that the battery 40 is not charged by the regenerative power during the zero torque control.

When the regenerative power is generated due to the resolver misalignment during the zero torque control, the regenerative power is lost as heat by the inverter 20, but since the regenerative power generated due to the resolver misalignment during the zero torque control is extremely smaller than the regenerative power generated during the three-phase ON control, the amount of heat generated in the inverter 20 is extremely small as compared with that generated during the three-phase ON control. Therefore, the inverter 20 is prevented from becoming overheated.

Further, when the battery 40 is prohibited from being charged while the MG 10 is being driven to rotate by the motive power from the driving wheel 2 and when the lost power during the zero torque control is smaller than the regenerative power generated due to the resolver misalignment, even if the zero torque control is performed, a part of the regenerative power generated due to the resolver misalignment may be supplied to the battery 40 without being lost by the inverter 20, and thereby, the three-phase ON control is performed. Thus, at the time when the battery 40 is prohibited from being charged, it is possible to prevent the battery 40 from being charged by the regenerative power more reliably.

Furthermore, when the battery 40 is prohibited from being charged while the MG 10 is being driven to rotate by the motive power from the driving wheel 2 and when the counter electromotive voltage Vc of the MG 10 is less than the battery voltage VB, even if all the arms of the inverter 20 are maintained at the nonconductive state, the regenerative current may not flow from the MG 10 to the battery 40, the vehicle ECU 100 according to the present embodiment performs the gate shutoff control on the inverter 20. Thus, compared with the case where the zero torque control is performed, it is possible to prevent the battery 40 from being charged by the regenerative power more reliably.

Moreover, the vehicle ECU 100 according to the present embodiment may determine (judge) whether or not the counter electromotive voltage Vc is less than the battery voltage VB based on the result of comparison between the motor rotation speed NM and the first threshold value N1 (i.e., the motor rotation speed NM obtained by experiments or the like at the time when the counter electromotive voltage Vc is equal to the minimum value VBmin of the battery voltage) stored in advance in the memory. Similarly, the vehicle ECU 100 according to the present embodiment may determine (judge) whether or not whether or not the regenerative power generated due to the resolver misalignment during the zero torque control is greater than the lost power during the zero torque control based on the result of comparison between the motor rotation speed NM and the second threshold value N2 (i.e., the motor rotation speed NM obtained by experiments or the like at the time when the regenerative power generated due to the resolver misalignment during the zero torque control) stored in advance in the memory. Thus, when the battery 40 is prohibited from being charged while the MG 10 is being rotated by the motive power from the driving wheel 2, it is possible to determine which one of the zero torque control, the three-phase ON control and the gate shutoff control should be performed based on the rotation speed NM.

The parameter used for determining which one of the zero torque control, the three-phase ON control and the gate shutoff control should be performed may be any parameter that is correlated with the motor rotation speed NM. For example, it is possible to determine which one of the zero torque control, the three-phase ON control and the gate shutoff control should be performed based on the rotation speed (vehicle speed) of the driving wheel 2 that is mechanically connected to the MG 10.

First Modification

In the embodiment described above, when the battery 40 is prohibited from being charged while the MG 10 is being driven to rotate by the motive power from the driving wheel 2 and when the motor rotation speed NM is within a region where the motor rotation speed NM is equal to or greater than the first threshold value N1 but less than the second threshold value N2, the zero torque control is performed. However, if it is detected that the battery 40 is being actually charged in this region, the three-phase ON control may be performed instead of the zero torque control so as to prohibit the charging.

In the embodiment described above, when the battery 40 is prohibited from being charged while the MG 10 is being driven to rotate by the motive power from the driving wheel 2 and when the motor rotation speed NM is within a region where the motor rotation speed NM is equal to or greater than the second threshold value N2, the three-phase ON control is performed. However, if it is detected that the inverter 20 or the MG 10 is overheated in this region, the zero torque control may be performed instead of the three-phase ON control so as to prevent the overheating.

Figure 7:
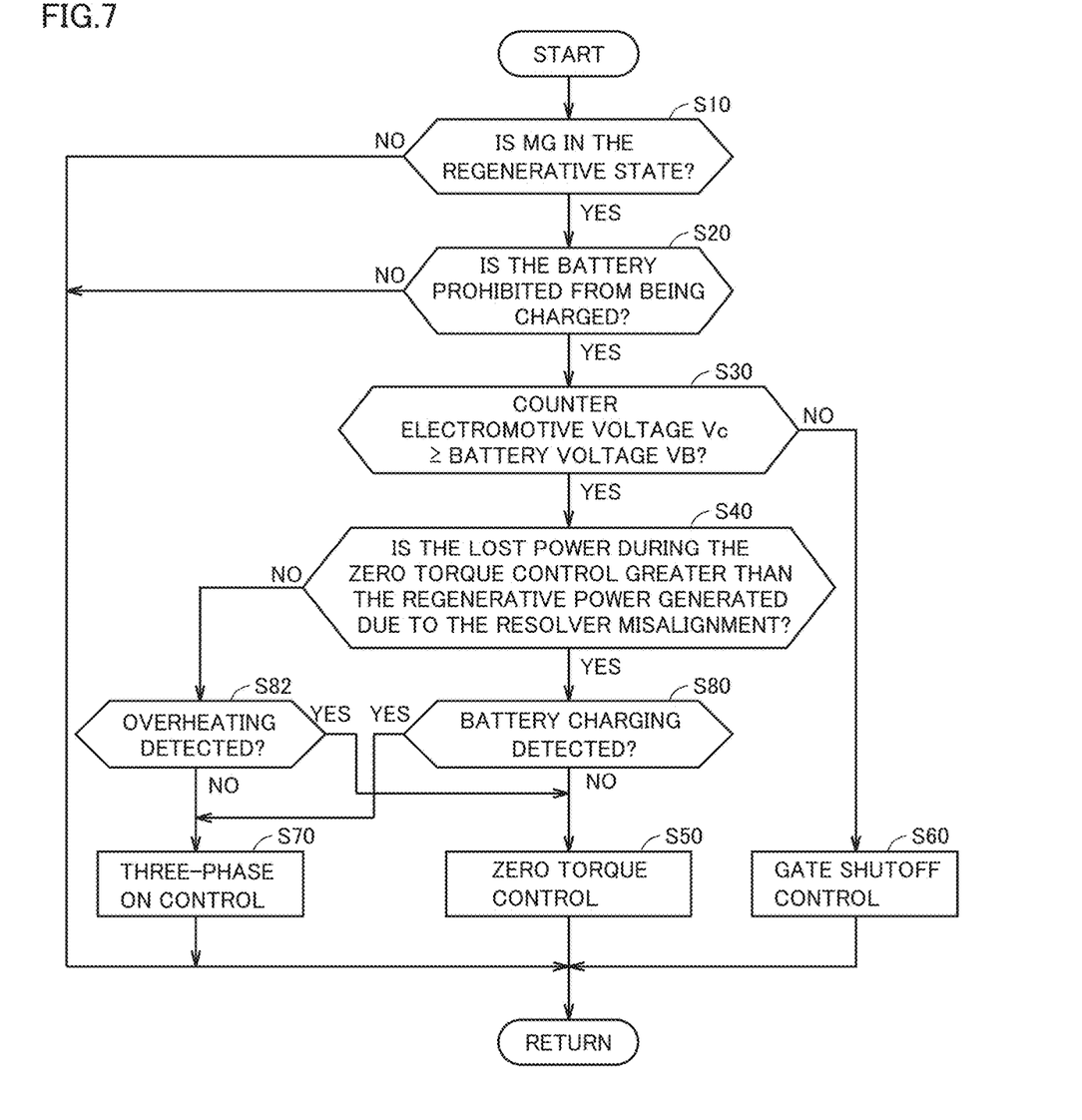
FIG. 7 is a flowchart illustrating another example of a process to be performed by the vehicle ECU.

FIG. 7 is a flowchart illustrating an example of a process to be performed by the vehicle ECU 100 according to the first modification. In the flowchart illustrated in FIG. 7, step S80 and step S82 are added to the above-described flowchart illustrated in FIG. 6. Since the other steps (the steps numbered with the same as the steps illustrated in FIG. 6) have already been described in the above, the detailed description will not be repeated.

If it is determined that the counter electromotive voltage Vc is equal to or greater than the battery voltage VB (YES in step S30) and the lost power during the zero torque control is greater than the regenerative power generated due to the resolver misalignment (YES in step S40), in other words, if the motor rotation speed NM is within a region where the motor rotation speed NM is equal to or greater than the first threshold value N1 but smaller than the second threshold value N2, the vehicle ECU 100 determines whether or not it is detected that the battery 40 is being actually charged (step S80). Specifically, when the vehicle ECU 100 receives from the battery ECU 60 an information indicating that a current for charging the battery 40 is detected by the current sensor 51, the vehicle ECU 100 determines that it is detected that the battery 40 is being actually charged.

When it is detected that that the battery 40 is not being actually charged (NO in step S80), the vehicle ECU 100 performs the zero torque control (step S50).

When it is detected that the battery 40 is being actually charged (YES in step S80), the vehicle ECU 100 performs the three-phase ON control instead of the zero torque control (step S70). As a result, the regenerative current is lost during the circulation between the MG 10 and the inverter 20 without being supplied to the battery 40 having a large resistance, which makes it possible to prevent the battery 40 from being charged.

If it is determined that the counter electromotive voltage Vc is equal to or greater than the battery voltage VB (YES in step S30) and the lost power during the zero torque control is smaller than the regenerative power generated due to the misalignment in resolver installation (NO in step S40), in other words, if the motor rotation speed NM is within a region where the motor rotation speed NM is equal to or greater than the second threshold value N2, the vehicle ECU 100 determines whether or not it is detected that the inverter 20 or the MG 10 is overheated (step S82). Specifically, if the temperature TI of the inverter 20 detected by the temperature sensor 55 is greater than an allowable temperature of the inverter 20 or if the motor temperature TM detected by the temperature sensor 57 is greater than an allowable temperature of the MG 10, the vehicle ECU 100 determines that it is detected that the inverter 20 or the MG 10 is overheated.

When it is detected that the inverter 20 or the MG 10 is not overheated (NO in step S82), the vehicle ECU 100 performs the three-phase ON control (step S50).

When it is detected that the inverter 20 or the MG 10 is overheated (YES in step S82), the vehicle ECU 100 performs the zero torque control instead of the three-phase ON control (step S50) so as to prevent the overheating. Thereby, the current flowing through the inverter 20 or the MG 10 is reduced as compared with the case where the three-phase ON control is performed, which makes it possible to prevent the inverter 20 or the MG 10 from becoming overheated.

In this way, the three-phase ON control and the zero torque control may be selected based on whether or not the actual charging or the overheating is detected in addition to the region containing the motor rotation speed NM.

Second Modification

In the process illustrated in FIGS. 6 and 7, step S20 is performed after step S10, step S20 may be performed before step S10.

In other words, when the battery 40 is prohibited from being charged (YES in step S20), the subsequent steps are continued, and when the charging of the battery 40 is not prohibited (NO in step S20), the subsequent steps are skipped, and the process proceeds to return (so as to perform a normal control).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A drive device for a vehicle equipped with an AC rotating electrical machine connected to a driving wheel, comprising:
   a power storage device;
   an inverter configured to convert DC power supplied from the power storage device to AC power and supply the AC power to the rotating electrical machine; and
   a control device configured to control the inverter, wherein
   the control device being configured to perform a zero torque control to drive the inverter so that an output torque from the rotating electrical machine is zero when the power storage device is prohibited from being charged while the rotating electrical machine is being driven to rotate by a motive power from the driving wheel; and
   the control device is configured to perform the zero torque control when the power storage device is prohibited from being charged while the rotating electrical machine is being driven to rotate by the motive power from the driving wheel and when it is determined that a power lost by the inverter is greater than a regenerative power from the rotating electrical machine during the zero torque control.

2. The drive device according to claim 1, wherein
   the inverter is electrically connected between the power storage device and the rotating electrical machine, and is provided with three-phase drive arms, each of which includes an upper arm and a lower arm,
   the control device is configured to perform a three-phase ON control to maintain the upper arm or the lower arm of each three-phase drive arm of the inverter in a conductive state when the power storage device is prohibited from being charged while the rotating electrical machine is being driven to rotate by the motive power from the driving wheel and when it is determined that the power lost by the inverter is not greater than the regenerative power from the rotating electrical machine during the zero torque control.

3. The drive device according to claim 1, wherein
   the control device is configured to:
   determine that the power lost by the inverter is greater than the regenerative power from the rotating electrical machine during the zero torque control when a rotation speed of the rotating electrical machine is less than a threshold value; and
   determine that the power lost by the inverter is not greater than the regenerative power from the rotating electrical machine during the zero torque control when the rotation speed of the rotating electrical machine is greater than the threshold value.

4. The drive device according to claim 1, wherein
   the control device is configured to perform a shutoff control to bring the inverter into a gate shutoff state when the power storage device is prohibited from being charged while the rotating electrical machine is being driven to rotate by the motive power from the driving wheel and when a counter electromotive voltage of the rotating electrical machine is less than a voltage of the power storage device.

5. The drive device according to claim 2, wherein
   even when the power storage device is prohibited from being charged while the rotating electrical machine is being driven to rotate by the motive power from the driving wheel and when it is determined that the power lost by the inverter is greater than the regenerative power from the rotating electrical machine during the zero torque control, the control device is configured to perform the three-phase ON control when it is detected that the power storage device is being charged.

6. The drive device according to claim 2, wherein
   even when the power storage device is prohibited from being charged while the rotating electrical machine is being driven to rotate by the motive power from the driving wheel and when it is determined that the power lost by the inverter is not greater than the regenerative power from the rotating electrical machine during the zero torque control, the control device is configured to perform the zero torque control when it is detected that the rotating electrical machine or the inverter is overheated.

7. A method for controlling a vehicle which is equipped with an AC rotating electrical machine connected to a driving wheel, a power storage device, and an inverter, the inverter being configured to convert DC power supplied from the power storage device to AC power and supply the AC power to the rotating electrical machine, the method comprising:
   determining whether or not the power storage device is prohibited from being charged while the rotating electrical machine is being driven to rotate by a motive power from the driving wheel;
   performing a zero torque control to drive the inverter so that an output torque from the rotating electrical machine is zero when the power storage device is prohibited from being charged while the rotating electrical machine is being driven to rotate by the motive power from the driving wheel; and
   performing the zero torque control when the power storage device is prohibited from being charged while the rotating electrical machine is being driven to rotate by the motive power from the driving wheel and when it is determined that a power lost by the inverter is greater than a regenerative power from the rotating electrical machine during the zero torque control.

* * * * *